Patented Feb. 27, 1934

1,949,311

UNITED STATES PATENT OFFICE 1,949,311

METHOD AND MEANS TO INCREASE THE ELECTRIC INSULATING PROPERTY OF CERAMICS SUCH AS PORCELAIN

Isidor Kitsee, Philadelphia, Pa., assignor to Mineralite Corporation, Philadelphia, Pa., a corporation of Pennsylvania No Drawing. Application March 28, 1930, Serial No. 439,862. Renewed August 26, 1933

3 Claims. (Cl. 18—47.5)

My invention relates to an improvement in the method and means to increase the electric insulating property of ceramics such as porcelain.

The efficiency of porcelain insulators resides to the greatest extent in the surface glazing of the insulator. The inner part of the insulator consists of very porous baked clay, in itself an insulator of very poor quality. When the outside glazing of a porcelain insulator is fractured, then the whole unit loses its efficiency as an insulator and it often happens that if such injured insulator is still employed in an electric circuit carrying a high Va, other parts of the outer glazing will fracture through the leakage of the current.

It is the aim of my invention to obviate this difficulty and to increase the insulating efficiency of the inner part of porcelain insulators.

Broadly speaking, this desired improvement may be accomplished with the aid of a material intermixed with the clay and adapted to fuse through the heat of the kiln itself, and if necessary the heat may be increased.

I have found that finely divided silicate will accomplish this purpose. But if it is desired to fill these pores which, during the period of baking the clay, are formed, I would advise to use what is now technically known as mineral wool.

Mineral wool per se consists mainly of silicate and an oxide of magnesium and some calcium oxide. Mineral wool per se is a very good insulator. The mineral wool and the clay should be well intermixed before molded in the desired form. I am aware that during this intermixture the mineral wool is broken up, but that breaking up does not interfere with the later process of fusing the silicate of the wool.

A porcelain made of a clay well intermixed with the mineral wool, and well baked, and glazed will even after it is broken, present the inner part as a partly or wholly glazed surface.

During the time of baking the molded clay, the silicate of the mineral wool will fuse and will thereby provide the baked clay parts adjoining the interstices with a glazed surface. The magnesium oxide will to a great extent fill the pores of the clay due to the shrinkage of the clay on account of the moisture taken from said clay.

It is hardly possible to give a strict rule of the amount of mineral wool to be intermixed with the clay, as the nature of the clay varies greatly in accordance with the localities from which this clay is taken. In general about 20% to 30% of the mineral wool suffices.

Having now described my invention, what I claim as new and desire to secure by Letters Patent, is:

1. The method of fabricating a ceramic article of manufacture, such as an electrical insulator, comprising adding a quantity of mineral wool to a body of clay, the major portion of the mixture being clay, thoroughly mixing the clay and wool to obtain a homogeneous product, molding the body of mixed clay and wool into an article of desired form, and baking the same at a temperature sufficiently high to fuse the wool, whereby the interior of said article is rendered dense, hard, and homogeneous throughout.

2. The method of fabricating a ceramic article of manufacture, such as an electrical insulator, comprising adding a quantity of mineral wool to a body of clay, the major ingredient of the mixture being clay, thoroughly mixing the clay and wool to obtain a homogeneous product, molding the body of mixed clay and wool into an article of desired form, and baking the same, the silicate of the wool being fused by the baking process so that the interior of the body is at least partially glazed, the magnesium oxide occupying any pores formed in the clay due to shrinkage, and the resulting article being dense, hard, and homogeneous throughout and possessing good dielectric properties.

3. An article of manufacture comprising a dense, hard, homogeneous body of baked clay silicate and oxide of magnesium, the interior of said body being partially glazed and substantially non-porous.

ISIDOR KITSEE.